United States Patent [19]
Thiel

[11] 3,767,501
[45] Oct. 23, 1973

[54] METHOD FOR PRODUCING THERMOPLASTIC ARTICLES HAVING THIN DOUBLE WALLS

[76] Inventor: Alfons W. Thiel, Ufestr. 15, Mainz am Rhein, Germany

[22] Filed: Oct. 19, 1970

[21] Appl. No.: 81,953

Related U.S. Application Data
[63] Continuation-in-part of Ser. No. 742,285, July 3, 1968, abandoned.

[30] Foreign Application Priority Data
Apr. 13, 1968 Germany............... P 17 78 270.6

[52] U.S. Cl................ 156/199, 156/214, 156/245, 156/250, 156/267, 156/459, 156/500, 156/528
[51] Int. Cl............................................. B32b 31/04
[58] Field of Search............ 264/88, 89, 90, 92–101, 264/267–269, 263; 156/199, 224, 228, 285, 214, 245, 250, 267, 459, 500, 528, 293

[56] References Cited
UNITED STATES PATENTS

| | | |
|---|---|---|
| 3,205,123 | 9/1965 | Hornbostel .................. 264/269 X |
| 3,142,599 | 7/1964 | Chavannes..................... 156/210 |
| 3,166,461 | 1/1965 | Sada ............................. 156/293 X |
| 3,283,045 | 11/1966 | Thiel.................................. 264/89 |
| 3,514,362 | 5/1970 | Chavannes..................... 156/219 X |
| 3,697,369 | 10/1972 | Amberg et al................. 156/244 X |

*Primary Examiner*—William A. Powell
*Attorney*—Strauch, Nolan, Neale, Nies & Kurz

[57] ABSTRACT

A method for producing cup-shaped, double-walled thermoplastic articles having two parts, namely a jacket and a liner nested in the jacket to define the inner and outer walls of the article, wherein batches of liners and batches of jackets are concomitantly formed in separate sheet sections of thermoplastic material at separate forming stations and at least one formed sheet section is transferred to a position where the jackets and liners of respective batches are internested, the internested parts are then blanked or cut out at a blanking or punching station to separate each pair of internested jacket and liner units, and the internested jackets and liners of each separated pair are secured together by beading or welding.

23 Claims, 13 Drawing Figures

Inventor
ALFONS W. THIEL

Strauch Nolan Neale Nies + Kurz
Attorneys

PATENTED OCT 23 1973 3,767,501

Inventor
ALFONS W. THIEL
Strauch Nolan Neale Nies & Kurz
Attorneys

METHOD FOR PRODUCING THERMOPLASTIC ARTICLES HAVING THIN DOUBLE WALLS

This is a continuation-in-part of application Ser. No. 742,285 filed July 3, 1968, now abandoned.

FIELD OF INVENTION

This invention relates to a process for the production of thin, double-walled, plastic articles such as cups or other forms of containers.

BACKGROUND

For the production of double-walled articles, which are made from a synthetic substance such as a thermoplastic, it has been known to produce separately a liner forming the inside wall of the article and a jacket forming the outside wall of the article, to nest these two parts one within the other, and then to connect them firmly with one another by beading around the open end. This mode of operation, however, is time-consuming and is too expensive for mass produced articles. Therefore, proposals have also been made already to form a multiplicity of jackets and liners simultaneously in one sheet made of thermoplastic or other synthetic substance or in one section of a web made of thermoplastic or other synthetic substance, whereby liners and jackets are produced one after the other, each time on half of the forming surface. In the succeeding punching or blanking station, both the liner and jackets are punched out and paired in a unit below it. The paired liners and jackets are then internested. As a result, only half as many double-walled articles will be produced as compared with the number of single articles that could be produced with the same shaping and processing machine in the same time.

SUMMARY OF INVENTION

The method and apparatus of this invention differs from the foregoing proposals mainly in that several jackets and liners are formed in sets or batches in separate sheet sections of material, and these batches of jackets and liners are paired and then internested before the jackets and liners are punched out. Following the internesting step, each assembled pair of jackets and liners in the two paired off batches are cut or punched out of the sheet material in one punching operation. During this separation step the jackets and liners of each assembled pair may be securely joined to each other at the open edge or mouth.

By producing the articles according to this invention, the jackets and the liners by virtue of being formed separately from one another may be molded from separate materials. At the same time, the materials can be different in composition and kind. Also, the materials can be of different thicknesses. For example, the jacket may have a greater thickness as compared with that of the liners. The materials can also be of different color, so that afterwards the liners and the jackets of the articles differ in their color.

In a particularly advantageous aspect of this invention, the parts of the article of the one type can be shaped in batches in a web made of thermoplastic or other synthetic substance, whereby this web is kept intact and is guided until after the separation of the articles, while the article parts of the other kind are integral sections of sheet, which, if need be, are cut out from a web, are fed to the web passing through, and are assembled with the parts of the articles of the one kind shaped in that web. By retaining the one web until after the separation of the articles is effectuated, the speedy, uninterrupted progress of production will be guaranteed in a particularly simple, but effective manner. The article parts of the other kind, at the same time, do not need to be molded a priori in a sheet-shaped material. It is also possible to shape the article parts of the other kind in batches in sections of a web and to cut the web sections containing the batches separately and on all sides to provide severed web sections which are fed to the web with the article parts of the one kind.

The invention also contemplates the forming of batches of liners and jackets in separate web sections which are both severed and one or both of the severed sheet sections are transferred to be superposed to internest the associated liners and jackets. Similarly the invention contemplates forming the batches of liners and jackets in separate individual sheet sections with one or both sheet sections being transferred to a superposed position where the associated liners and jackets are internested.

The firm internesting of the liner in the jacket, which is required as a rule, can be realized relatively simply within the framework of this invention. For this purpose, the internested sheet or web sections can be pressed together for the firm assembly of the liners and jackets during the assembly of the article parts molded in them. It is also possible to press these sheet or web sections together during separation of the articles. Therefore, a firm assembly of the liners and the jackets is provided during the punch-out step.

Specific embodiments of the invention are described after the following description of the drawings.

DESCRIPTION OF DRAWINGS

FIG. 11 is a schematic view like FIG. 1 showing a further embodiment wherein jackets and liners respectively, like in FIG. 1, are formed in the leading end sections of separate continuous webs, but wherein the formed sections are both severed and both are moved to a nesting station;

FIG. 12 is also a schematic view like FIG. 1 showing a further embodiment wherein individual sheet sections at two separate forming stations are each formed with a batch of jackets or liners, and one of the formed sections is moved to nest with the other; and FIG. 13 is also a schematic view like FIG. 1 showing a further embodiment wherein individual sheet sections are each formed at one station with a batch of jacket or liners, and a batch of jackets or liners is formed in the leading end of a continuous web at another station to which the formed sheet section is transported as in the FIG. 1 embodiment.

DETAILED DESCRIPTION

Figure 1:
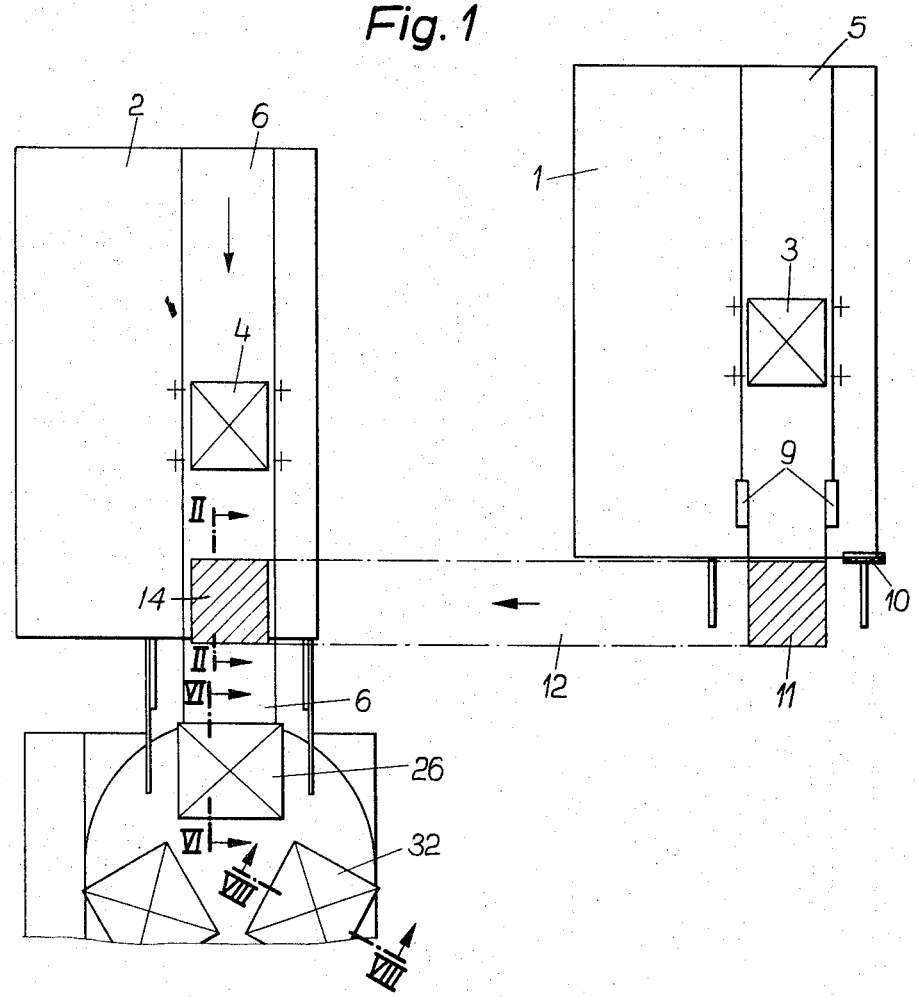
FIG. 1 is a schematic plan view of the apparatus for carrying out the production method according to this invention.

Referring to FIG. 1, two molding machines 1 and 2 are respectively provided with molding stations 3 and 4. Continuous strip-like sheets or webs 5 and 6, which are made of thermoplastic or other synthetic material are advanced respectively through stations 3 and 4. In one embodiment, jackets indicated at 7 are shaped or molded in sheet 5 at station 3, and liners indicated at 8 are shaped or molded in sheet 6 at station 4.

Molding station 3 is provided with a multiplicity of jacket molds so as to simultaneously form a corresponding number of jackets each time it is operated. The simultaneously formed jackets constitute a single batch, and batches containing equal numbers of jackets are successively formed as sheet 5 is advanced through station 3.

Likewise, molding station 4 has a multiplicity of forms or molds for shaping or molding a corresponding number of liners 8 in sheet 6. The simultaneously formed liners constitute a single batch, and batches containing equal numbers of liners are successively formed in sheet 6 as the sheet is advanced through station 4. The jackets and liners respectively shaped in sheets 5 and 6 are preferably arranged in straight rows.

Sheet 6, which is processed in molding machine 2 may be of a softer, and, if need be, more temperature resistant thermoplastic or other synthetic material as compared with sheet 5. Moreover, sheet 6 can be thinner than sheet 5, since liners 8 can be drawn less deeply than jackets 7. Also, the wall thickness of liners 8 may be less than that of jackets 7.

Jackets 7 and liners 8, which are molded in the section of the sheets 5 and 6 in each operational step of molding machines 1 and 2, are preferably of the same number and have the same surface arrangement within the molded sections of sheets 5 and 6.

Behind station 3 a pair of roller slitters 9 are arranged on molding machine 1. Sheet 5 advances first through station 3 and then past slitters 9 which trim sheet 5 laterally to a smaller width than sheet 6. Behind molding machine 1 there is a cross cutter 10, which cuts off the sections of sheet 5 each containing one batch of jackets which is formed in one operational step of molding machine 1. Cross cutter 10 has two parallel cutting arrangements for trimming the cut-off sheet sections 11 in a transverse direction and to a somewhat smaller size as compared with that following an operational step of molding machine 1 or of an operational step of equal size of molding machine 2. The severed sheet sections 11, produced in this manner and trimmed in each case corresponding to one operational step of the molding machines, are successively guided to sheet 6 at an assembly station by means of a conveyor arrangement 12, and the batch of parts formed in each severed section 11 are combined with the corresponding section 14 of sheet 6 at the assembly station. The different methods of assembly will now be described.

Figure 2:
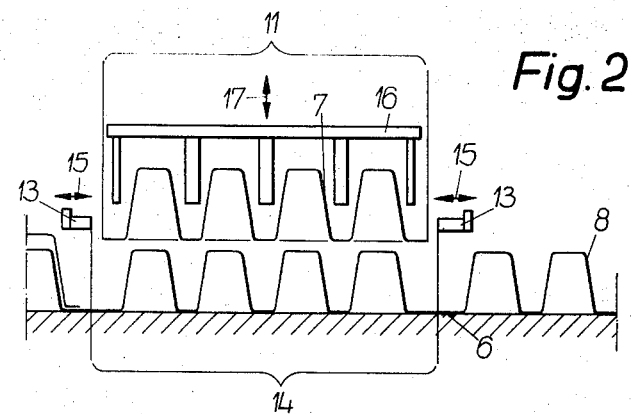
FIGS. 2 to 5 each show the consolidation or assembly station in vertical section as taken substantially along lines II—II of FIG. 1, with a different embodiment being illustrated in each Figure.

As shown in FIG. 2, jackets 7 and liners 8 according to one embodiment, are formed by machines 1 and 2 in an upward direction. Each severed section 11, after it is trimmed, is guided laterally by means of rails 13 until it is immediately above the uncut section 14 of sheet 6. When jackets 7 in section 11 have been aligned above section 14, rails 13 are moved outwardly along the path shown by the double arrows 15. As a result, section 11 drops onto section 14, thereby nesting jackets 7 over liners 8. For the purpose of providing a well seated assembly of jackets 7 on liners 8, an insertion and impressing device 16 is vertically displaceable along the path shown by the double arrow 17. By moving device 16 downwardly, section 11 is pressed onto liner section 14. FIG. 2 shows at its left a preceding section 14 which has seated thereon the preceding section 11. At the right-hand end of FIG. 2 is the unassembled section 14 which will receive the next section 11 that follows the one shown in FIG. 2.

It is clear from FIG. 2, therefore, that successively formed sections containing jackets 7 and indicated at 11 are sequentially seated on the successively formed liner sections 8 which are indicated at 14 and which, at this stage, are still integral with sheet 6. Sheet 6 together with the sections 11 assembled thereon then are guided, as explained later, to an article separating device.

Figure 3:
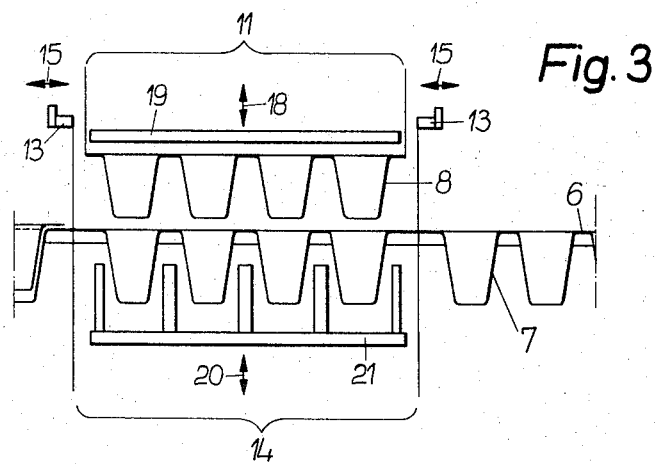

In the embodiment shown in FIG. 3, liners 8, instead of jackets 7, are formed at station 3 in sheet 5, and jackets 7, instead of liners 8, are formed at station 4 in sheet 6. The sheet sections 11, each containing a batch of liners 8, are severed from the continuous sheet 5 and are trimmed in the manner previously described. In this embodiment, jackets 7 and liners 8 are molded downwardly so that their open ends face upwardly. The thusly formed sections 11 are then guided by rails 13 over the pertinent section 14 of sheet 6 to align liners 8 with jackets 7. Upon release of section 11 through an outward movement of rails 13, section 11 will drop onto section 14 to seat liners 8 in the jackets 7 which are formed in section 14. In this example too, an arrangement for pressing sections 11 and 14 together may be provided. Such an arrangement conprises a pressure plate 19 which is moved in the direction of the arrow 18, and a counter holding device 21, brought up from below and following the direction of arrow 20 to bear against the sheet section 14. In this example too, the successively formed sections 14 of sheet 6 are covered with sections 11, and this assembly is guided to the separation station. As shown, the sheet or web portions of sections 14, which in this embodiment contain the batches of jackets 7, are not severed from sheet 6, and only the molded parts (jackets or liners, as the case may be) are cut out of sections 14 at the separation station, leaving the remaining sheet or web portions of sections 14 integral with sheet 6.

Figure 4:
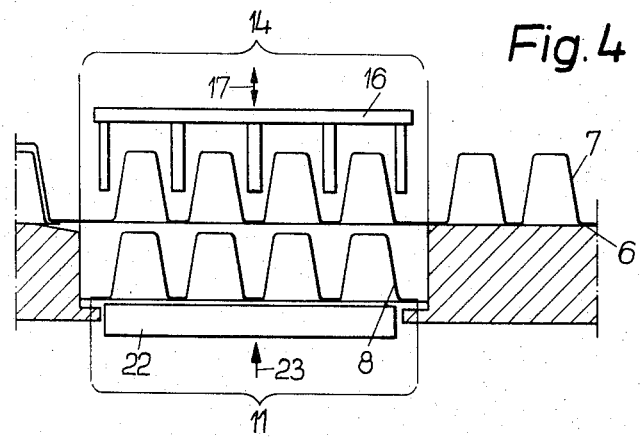

In the embodiment shown in FIG. 4, liners 8 are molded in batches upwardly in sheet 5 to form sections 11, and the sections 11, each containing a batch of thusly formed liners 8 are severed from sheet 5 and then trimmed, all as previously described. In sheet 6, which is processed in molding machine 2, jackets 7 have been molded upwardly in the corresponding sections 14. As compared with the examples of FIGS. 2 and 3, sheet sections 11 are now successively fed below sections 14 and are lifted by means of a plate 22 to seat liners 8 in the corresponding jackets 7 thereabove.

Plate 22 is raised in the direction of arrow 23 to assemble sections 11 on corresponding sections 14 in sheet 6.

As shown in FIG. 4 a counter-holding device 16 is disposed above sheet 6 and is moved up and down in the direction shown by arrow 17. In this example too, sheet 6, when covered with sections 11 is then guided to the separating device.

Figure 5:
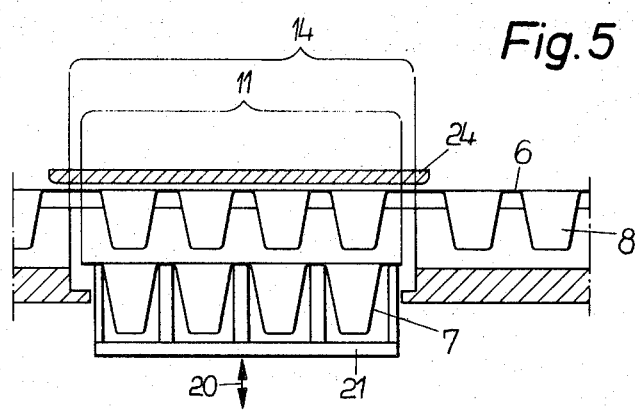

In the embodiment shown in FIG. 5, jackets 7 are molded in batches downwardly into sheet 5 to form sections 11, and sections 11, each containing one batch of jackets, is severed from sheet 5 and trimmed in the previously explained manner. In this embodiment, liners 8 are formed downwardly in batches in sheet 6 to form successive sections 14, each containing one batch of liners. In this example, sections 11, containing jackets 7, are fed to the assembly station below corresponding ones of sections 14 in sheet 6 and are then lifted by means of a press device 21, reaching between the jackets and moving in the direction of arrow 20 to be pressed over the liners 8 which are molded in section 14. For this purpose a support plate 24 can be provided above sheet 6.

Figure 6:
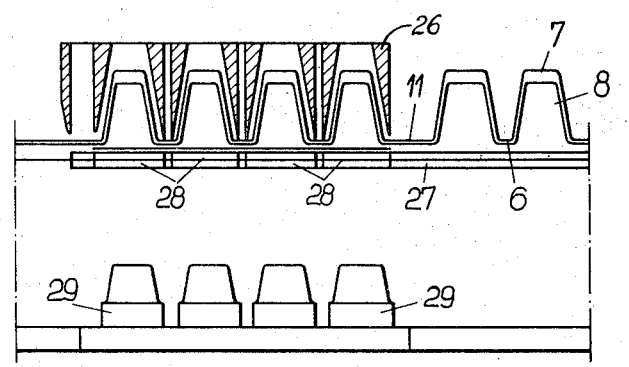
FIG. 6 shows the separating station in a vertical section as taken substantially along lines VI—VI of FIG. 1.
Figure 9:
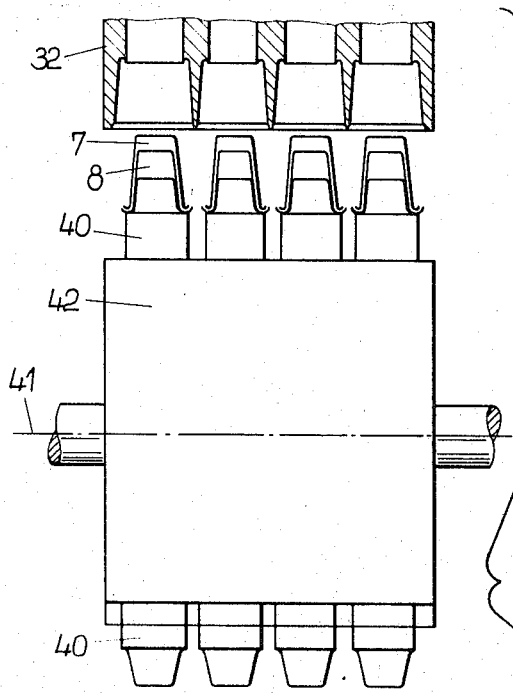
FIG. 9 shows a modified separation station and edge rolling station in a vertical section.
Figure 7:
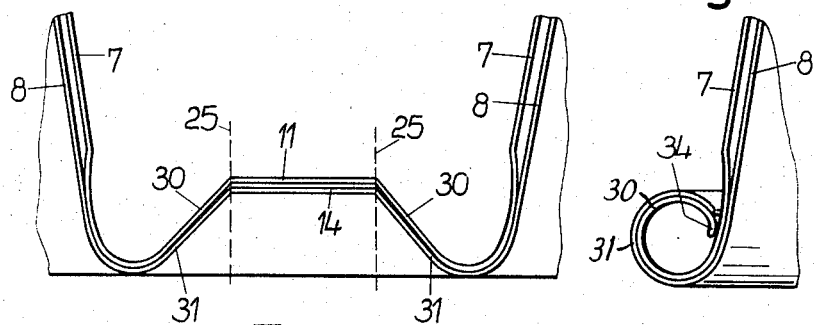
FIG. 7 is an enlarged fragmentary, diagrammatic view of the edge area of two assembled liners and jackets and of the interconnecting scrap, web area of the sheets.

According to the invention, the severance of assembled pairs of jackets 7 and linings 8 takes place jointly by cutting or punching through sections 11 and 14 around the edges of jackets 7 and liners 8 along the lines indicated at 25 in FIG. 7. This can take place, for practical purposes and as the examples of FIGS. 6 and 9 show, by a punching operation.

Figure 8:
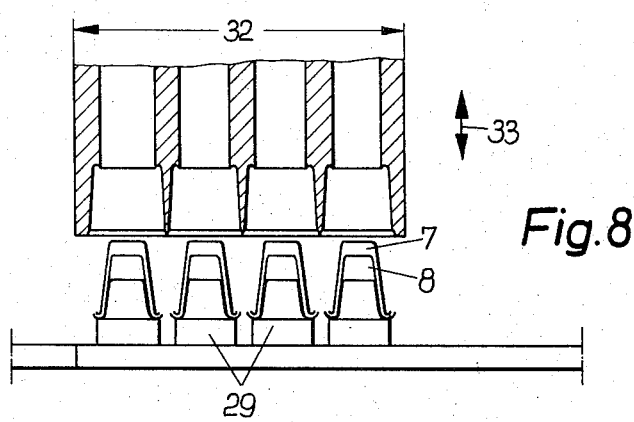
FIG. 8 is a vertical section taken substantially along lines VIII—VIII of FIG. 1 and illustrating the edge rolling station.
Figure 10:
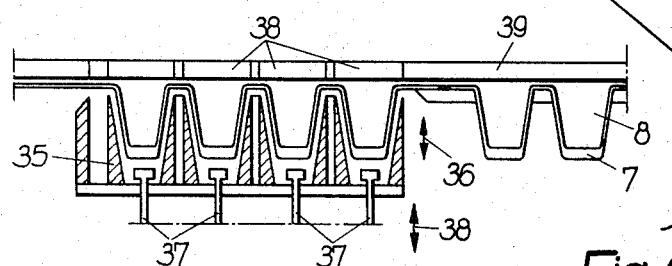
FIG. 10 is an enlarged, fragmentary section of the edge area of the mouth of the article in the region where the liner and jacket are joined together.

As shown in FIG. 6, a punching device 26 acts from above and is located at a punching station which follows the assembly station shown in either FIG. 2 or FIG. 4. Below punching device 26, a punching table 27 has openings 28, through which the separated pairs of liners 8 and jackets 7 drop together, as a result of having been punched out from sheet 6 and sections 11. The punched out liner and jacket pairs drop down to seat on stools 29. The liner and jacket of each pair seated on one of the stools 29 are then firmly and securely connected with one another at the region of their edges peripherally surrounding the open end of the article. This process of connecting can be accomplished preferably by rolling together the peripheral collars 30 and 31 of jacket 7 and liner 8, which to overlie as a result of the punching operation. A tool 32 for this purpose is shown in FIG. 8 and is guided from above in the direction of arrow 33 over the pairs of jackets 7 and liners 8 which are seated on stools 29. The construction and the mode of operation of such a tool are known. See, for example, German Pat. No. 1,187,784. As a result of the foregoing operation, a joined-flange connection is obtained between liner 8 and jacket 7 with collar 30 being rolled within the bead on collar 31 as shown in FIG. 10. As a result of the previously described joint punching operation, collars 30 of jackets 7 are somewhat wider than collars 31 of liners 8. However, this is not a disadvantage, for collar 30, as indicated at 34 in FIG. 10, is rolled up a little further than collar 31 of liner 8.

Whenever liners 8 and jackets 7, as in the case of the examples shown in FIGS. 3 and 5, are molded downwardly, sheet 6 and sections 11, which have been put on sections 14, first require reversal if the separation and the firm connection of the jacket and liner pairs is carried out with devices shown in FIGS. 6 and 8. FIG. 9 shows a construction which avoids such a reversing step.

For this purpose, a punching device 35 acts from below and is moved upwardly in the direction of arrow 35. To punching device 35, elevators 37 have been attached, and elevators 37 are moved upwardly in the directions of arrow 38 to lift the punched-out jacket and liner pairs through openings 38 in a punching table 39 and to guide them from below onto stools 40. Stools 40 are attached to a carrier 42, which has a cube-like shape surrounding an axis 41 and which is provided with suction devices in order to hold the jacket and liner pairs that have been put on the stools. By swinging carrier 42 through arcs of 90° or 180°, the jacket and liner pairs which are sitting on stools 40 are located so that a tool such as edge rolling tool 32 can be guided over the jacket and liner pairs.

Instead of joining jacket 7 and liner 8 together by rolling or beading collars 30 and 31, the peripheral edges of liner 8 and jacket 7 may be welded together. For this purpose, stools 29 or 40 could be used as carriers for the jacket and liner pairs.

This invention provides for the production of double-walled articles in the same quantity as single-walled articles, without using two complete sets of production lines for the purpose as had been considered necessary.

In FIG. 11 continuous sheets or webs 5 and 6 are introduced into the molding machines, and they are formed at molding stations 3 and 4 with successive batches of liners and jackets respectively. After leaving molding station 3, the leading sheet sections 11 each containing a batch of liners are successively severed from web 5, and after leaving molding station 4 the leading sheet sections 11' of web 6 are severed successively, each sheel section 11' containing an associated batch of jackets. Batches of liners and jackets are formed simultaneously in the separate webs. The corresponding severed leading sheet sections 11 and 11' are moved into nested relation at 12'. The nesting and following operations of cutting out the nested jacket-liner pairs and securing them together permanently are the same as disclosed for the earlier embodiments.

In FIG. 12 at molding machine 1 a series of individual sheet sections 5' are fed in succession to forming station 3 where they are each formed with a batch of liners and fed forwardly to the position indicated at 11 where they correspond to the severed sheet sections of liners of molding machine 1. Similarly at molding machine 2 a series of individual sheet sections 6' are fed in succession to forming station 4 where they are each formed with a batch of jackets and forwardly disposed at 14'. Now the sheet sections 11' are transferred by a conveyor 12 into nested relation with the sheet sections 14', and the operations of securing the sheet sections together and cutting out the nested jacket-liner pairs and welding them together is accomplished as explained above.

In FIG. 13 at molding machine 1 a series of individual sheet sections 5' are introduced in succession, and at molding station 3 they are each formed with a batch of liners and advanced to the position indicated at 11 as in FIG. 12. At molding machine 2 a continuous sheet or web 6 passes through molding station 4 where it is formed with a successive series of batches of jackets as in FIG. 1, and the sheet sections containing each batch of jackets are severed from the web and disposed as sheet sections in the position indicated at 14'. Now sheet sections 11 are moved to a nesting relation with sheet sections 14' where they are combined as heretofore described, and then the nested pairs of jackets and liners are cut out and welded together as heretofore described.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of producing cup-shaped, double-walled articles from synthetic material wherein the outer wall of each article is defined by a jacket and wherein the inner wall of each article is defined by a liner nested in the jacket, said method comprising the steps of forming in a first forming station first sheet sections of synthetic sheet material with each of said first sheet sections containing a batch of said liners, forming in a second forming station second sheet sections of synthetic sheet material with each of said second sheet sections containing a batch of said jackets, imparting relative motion between the thusly formed first and second sheet sections to arrange first and second sheet sections at an assembly station with said liners nested in said jackets, thereafter cutting out the individual nested pairs of the liners and jackets and then securing together the liners and jackets of each cut-out pair.

2. The method defined in claim 1, wherein said batches of liners and jackets are both formed in individual separate sheet sections.

3. The method defined in claim 1, wherein one group of said batches is formed in sheet sections that are integral portions of a continuous web, and the other group of batches is formed in individual separate sheet sections.

4. The method defined in claim 1, wherein said liners and jackets are formed from different thermoplastic materials.

5. The method defined in claim 1, wherein said liners are formed of material of less thickness than the material of said jackets.

6. The method defined in claim 1, wherein batches of liners are formed at substantially the same time as corresponding batches of jackets, in the separate forming stations.

7. The method defined in claim 1, comprising the step of pressing said nested first and second sheet sections together to securely seat the nested liners in said jackets.

8. The method defined in claim 1, wherein the jackets and liners of each of said cut-out pairs are secured together along their edges peripherally surrounding their open ends.

9. The method defined in claim 1, wherein one of said sheet sections is in overlying relation relative to the other of said sections when said liners are nested in said jackets, and wherein said pairs are cut out of said first and second sheet sections in one continuous motion, first cutting through one of said sheet sections and then through the other of said sheet sections without interruption.

10. The method defined in claim 1, wherein said liners and jackets are formed from materials of different colors.

11. The method defined in claim 1, wherein said liners are formed of a softer material than said jackets.

12. The method defined in claim 1, wherein the material of said liners is more resistant to temperature than the material of said jackets.

13. The method defined in claim 1, wherein said batches of liners are formed in sheet sections that are integral portions of a first continuous web, and said batches of jackets are formed in sheet sections that are integral portions of a second continuous web, and successive batch containing sheet sections of at least one of said webs are severed and transported to nesting relation with the corresponding sheet sections of the other web.

14. The method defined in claim 13, wherein the successive batch containing sheet sections of both webs are severed prior to being transported to an assembly station.

15. The method defined in claim 1, wherein the sequence of one of said sheet sections is trimmed longitudinally prior to transfer to said assembly station.

16. The method defined in claim 15, wherein said sequence of one of said sheet sections is laterally trimmed prior to said transfer.

17. A method of producing cup-shaped, double-walled articles from synthetic material wherein the outer wall of each article is defined by a jacket and wherein the inner wall of each article is defined by a liner nested in the jacket, said method comprising the steps of separately providing a plurality of first sheet sections of synthetic sheet material and a plurality of second sheet sections of synthetic sheet material, advancing said first sheet sections through a first forming station for forming a batch of said liners in each of said first sheet sections, advancing said second sheet sections through a second forming station for forming a batch of said jackets in each of said second sheet sections, imparting relative motion between the thusly formed first and second sheet sections to arrange first and second sheet sections at an assembly station with said liners nested in said jackets, thereafter cutting out the individual nested pairs of liners and jackets and then securing together the liners and jackets of each cut-out pair.

18. A method of producing cup-shaped, double-walled articles from synthetic material wherein the outer wall of each article is defined by a jacket and wherein the inner wall of each article is defined by a liner nested in the jacket, said method comprising the steps of providing separate, first and second continuous sheets of synthetic material for respectively defining a plurality of first sheet sections and a plurality of second sheet sections, advancing said sheets through separate forming stations for forming a batch of said liners in each of said first sheet sections at one of said stations and for forming a batch of said jackets in each of said second sheet sections at the other of said stations, successively severing the formed sheet sections from one of said sheets, imparting relative motion between the thusly severed sheet sections and the formed sheet sections of the other of said sheets to arrange first and second sheet sections at an assembly station with said liner nested in said jackets, thereafter cutting out the individual nested pairs of liners and jackets, and finally securing together the liner and jackets of each cut-out pair.

19. The method defined in claim 18, wherein the formed sheet sections in the other of said continuous sheets are maintained integral with said other continuous sheet throughout the steps of imparting said relative motion to said first and second sheet sections to nest said liners in said jackets and of cutting out the nested liner and jacket pairs from said first and second sections.

20. The method defined in claim 18, wherein said relative motion is effected by successively transferring each formed severed sheet section to nested relation with the formed unsevered sheet section of the other sheet.

21. The method defined in claim 18, comprising the step of pressing said first and second sections together to securely seat the nested liners in said jackets.

22. The method defined in claim 18, wherein the jackets and liners of each of said pairs are secured together along their edges peripherally surrounding their open ends.

23. The method defined in claim 18, wherein one of said sections is in overlying relation relative to the other of said sections when said liners are nested in said jackets, and wherein said pairs are cut out of said first and second sections in one continuous motion, first cutting through one of said sections and then through the other of said sections without interruption.

* * * * *